H. POOLEY.
WEIGHING MACHINE.
APPLICATION FILED JAN. 15, 1910.

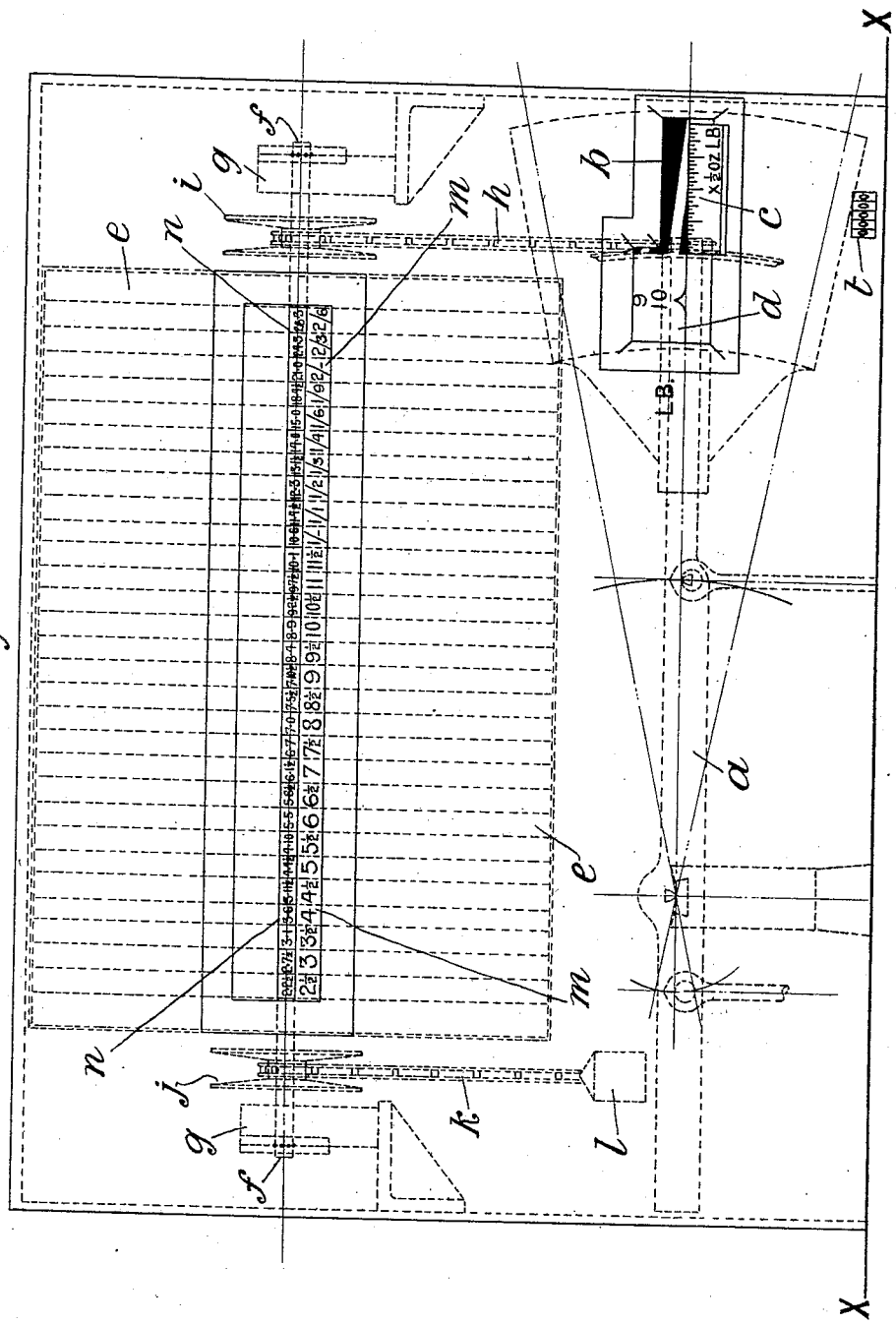

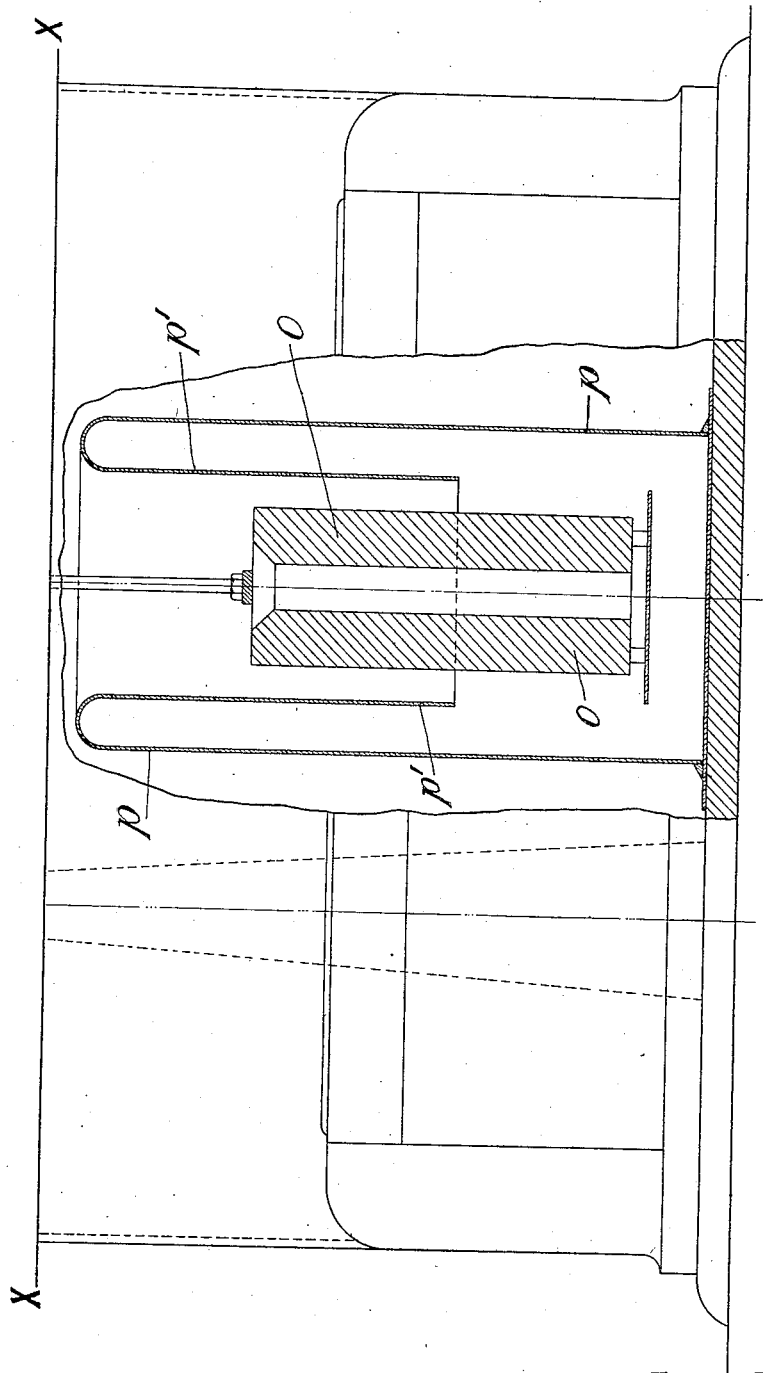

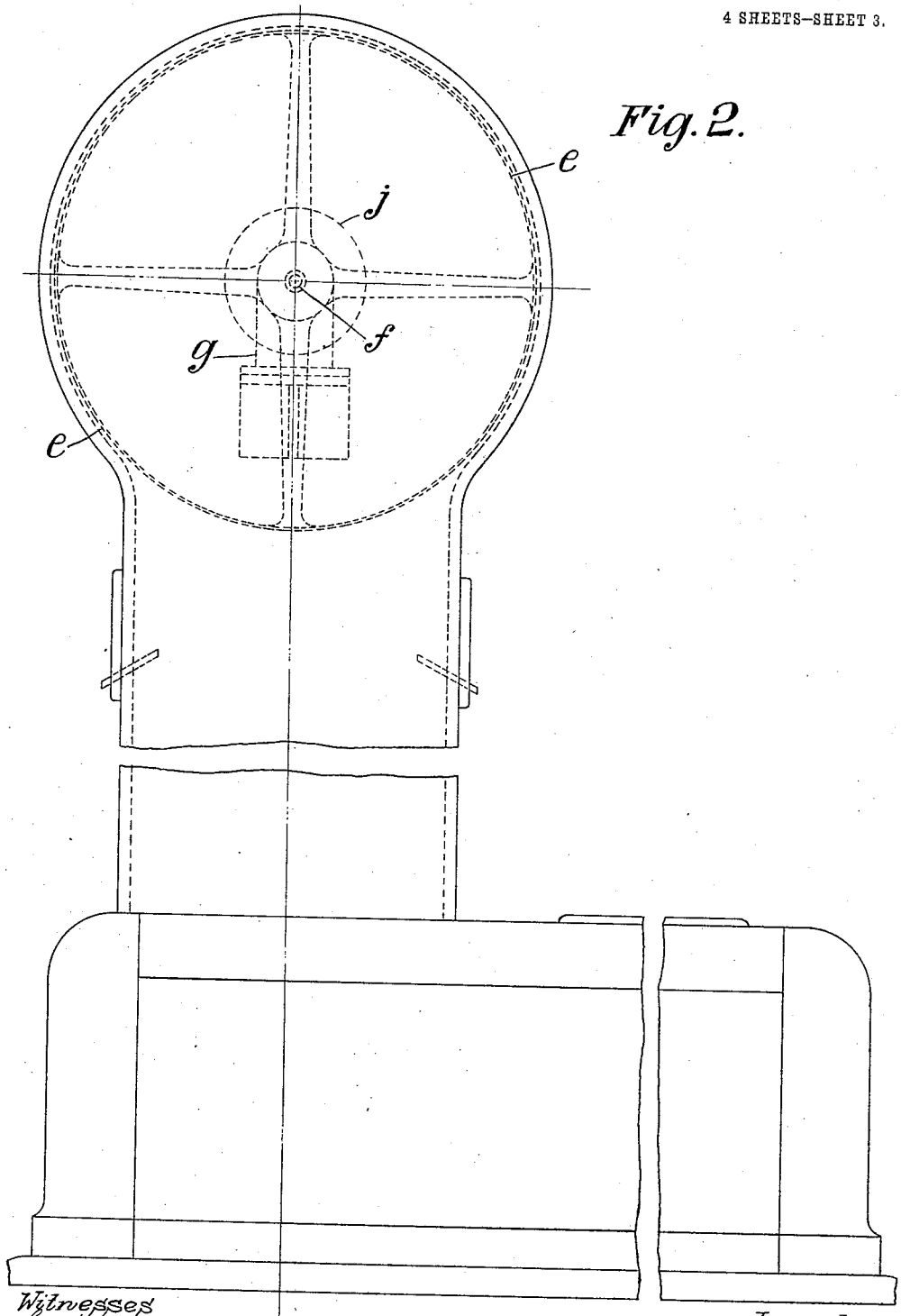

1,028,604.

Patented June 4, 1912.

4 SHEETS—SHEET 4.

Witnesses

Inventor
Henry Pooley

UNITED STATES PATENT OFFICE.

HENRY POOLEY, OF BIRMINGHAM, ENGLAND.

WEIGHING-MACHINE.

1,028,604. Specification of Letters Patent. Patented June 4, 1912.

Application filed January 15, 1910. Serial No. 538,264.

*To all whom it may concern:*

Be it known that I, HENRY POOLEY, a subject of the King of England, residing at Birmingham, in the county of Warwick, England, have invented new and useful Improvements in Weighing-Machines, of which the following is a specification.

This invention has reference to automatic weighing machines, and more particularly to those in which the counterpoise for balancing the load has a considerable movement, and in which the counterpoise moves in a vessel containing a fluid, such as water, oil, mercury, glycerin, or a mixture, or the vessel moves, and the mass or body is stationary. In such machines the steelyard sometimes carries a chart on which the weight is graduated, and which moves past a fixed pointer, thus indicating the amount of the load weighed; or the steelyard may have a pointer fixed on it, moving over a fixed chart for the same purpose.

One of the objects of the invention is to provide improvements in automatic weighing machines whereby the price of the article weighed is automatically given; and a further object and effect of the invention is to so construct the parts of such automatic weighing machines, that when not in use, one part thereof can be secured to a fixed part of the machine and hold the other parts inoperative, so that no matter whether the machine in being moved is turned or placed in any position, the whole of the working parts will not become disarranged or disorganized, but will, when the machine is again set in position and such part released, the whole of the mechanisms will assume their proper position, and be in working order ready for use.

The invention is illustrated in the accompanying drawings in which—

Figure 3:
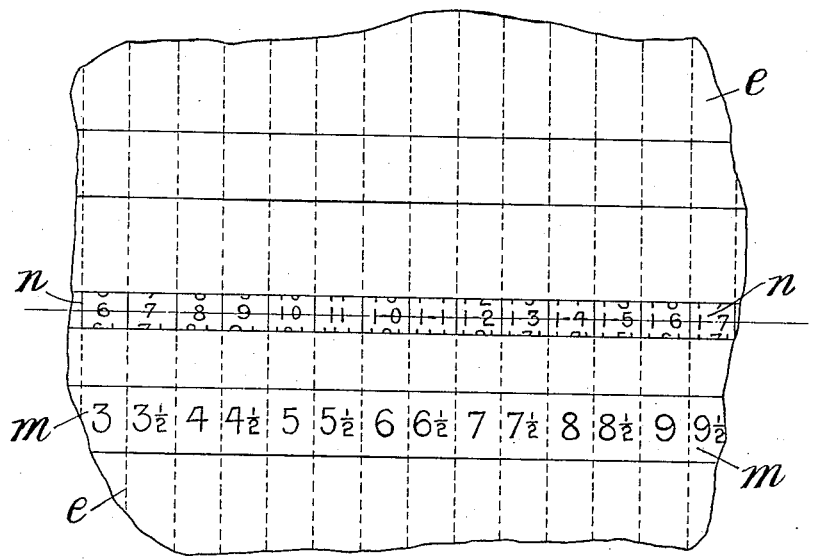
Figure 4:
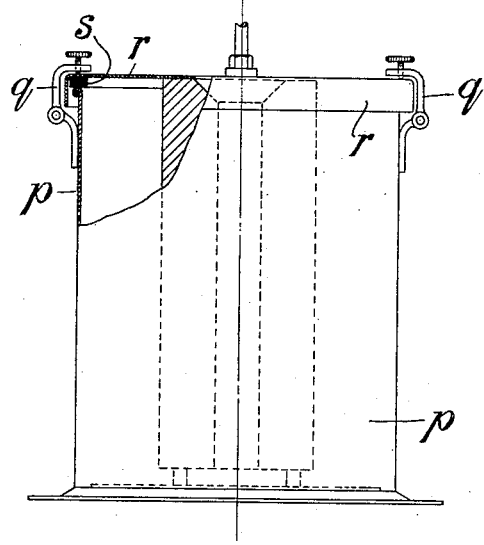

Figures 1 and 1ª illustrate in sectional elevation, and Fig. 2 in side view the improved machine. Fig. 3 is a detail view to an enlarged scale hereinafter explained, and Fig. 4 is a further detail, partly in section, of a part of the machine controlling the operation of the steelyard.

In the weighing machine illustrated, the steelyard *a* is provided at one end with a chart *b*, having inclined lines thereon, and adapted to operate in conjunction with a vernier *c*, whereby portions of definite quantities of a weight are indicated, while the definite quantities themselves are indicated by another portion *d* of the chart, by means of numerals marked thereon; and these definite quantities are indicated as pounds (lbs.), while the portions thereof, indicated by inclined lines and vernier, are ounces, or parts of an ounce; but it will be obvious that these quantities may be in tons, cwts., or other denomination of weight, provided the two scales are so marked in proportion as to operate in conjunction with one another, similarly to the weights indicated in the drawings. In conjunction with this weight indicating scale there is employed a price indicating scale; and this scale is carried or marked on a drum *e*, rotatable on a spindle *f*, carried in bearings *g* at each end, such bearings being carried on brackets supported at the sides of the machine. The rotation of the drum or scale, as shown, is effected by a chain *h* and pulley *i*, mounted on the spindle *f* of the price indicating drum; the chain *h* being connected to the steelyard *a*, and to the said pulley *i*. On another part of the said spindle *f* is mounted a second pulley *j*, and on this is supported, by means of the chain or other medium *k*, the weight *l*.

By the above construction, it will be seen that the drum is rotated in one direction by the steelyard and the connection *h* and pulley *i*, while its return is effected by the weight *l* on the second pulley *j*; so that no matter which way the steelyard moves up or down, the price drum will move correspondingly and indicate the price of the article weighed according to its weight.

The price drum is divided up into a number of equal divisions or spaces by lines or other means; and these divisions or markings have a series of successively increasing denominations marked thereon, arranged to agree with the price or value of the article being weighed at so much for a definite quantity, such as for a pound.

In the arrangement illustrated in Fig. 1 the pricing scale is marked *m*, and if reference is made to the weight indicating chart it will be seen that a supposed quantity is being weighed and amounts to 10 lbs. 8 ozs. To ascertain the price of such weight influence, say at 8d. per lb., it will be seen by the portion of the scale illustrated in Fig. 1 that this amounts to 7 shillings. To permit of only one line of price of all these markings on the drum being seen by the user of the machine; the drum is inclosed in a part of the casing of the machine; and the front portion of this casing has an opening $n$ formed therein to enable such line of prices to be seen; and it will be obvious that this line of prices changes with the weight of the article being weighed and priced. In the enlarged view, Fig. 3, this pricing scale is shown with a division occurring between the prices marked on the drum, and the prices on the scale $n$.

In the automatic weighing machine illustrated the steelyard $a$ is connected to the counterpoise $o$ in the usual manner, and such counterpoise is suspended in a liquid contained in a vessel $p$ which is provided with inner walls $p^1$, conveniently formed by returning the outer wall at its upper end, and carrying this down for a considerable length within the same. In constructing the vessel in this manner, the movement of the counterpoise in the liquid when the machine is moved, or under other circumstances, does not cause the liquid contained in the vessel or container to be splashed over the top edges. That is, if considerable movement is imparted to the liquid by the movement of the weight, such movement of the liquid will be between the inner and outer walls from which it cannot escape. As a further means for preventing the liquid escaping, especially when the machine is being moved from place to place, the vessel containing the liquid, whether it is provided with the inner wall or not, may, as shown in Fig. 4, be provided with hinged lugs $q$ adapted to take over the inclosing cap $r$, mounted on the counterpoise, or may be the rod connecting this with the steelyard. When the machine is to be moved as above stated, the counterpoise is lowered into the liquid containing vessel, and the inclosing cap $r$ pressed down through the medium of packing $s$ upon the upper end of the said vessel, and is held in this position by the hinged lugs $q$ and screws, or their equivalents, with which the lugs are fitted, by means of which the inclosing cap $r$ is pressed tightly against the upper end of the vessel and prevents the liquid escaping. This means for holding the counterpoise within the liquid containing vessel when the machine has to be moved, also serves to hold the price indicating drum against rotation; and this insures both parts being held against relative movement when the machine as a whole is being moved from place to place. The machine is also illustrated as being fitted with counter mechanism $t$ (see Fig. 1), which is adapted to be operated from the steelyard by a connection with its end, or through the weight indicating chart.

The whole of the parts above described are shown inclosed in a casing in the form suitable for an automatic weighing machine; but it will be obvious that this is not essential to the invention, provided the machine be fitted with means for indicating the price of the quantity weighed for preventing the liquid splashing and for holding the various parts stationary when the machine as a whole is being moved.

Although the price indicating chart is shown as being arranged on a cylindrical drum, it will be obvious that other forms may be employed, provided it be so adapted to move in accordance with the steelyard as to indicate the price of the quantity being weighed.

Although the application of the invention has been shown in connection with a hydrostatic weighing machine, it will be obvious that with slight modifications it may be fitted to other types of weighing machine. That is, the price indicating scale may be connected to the steelyard of a machine other than that controlled by the displacement of the liquid, and the movement of such steelyard when the machine as a whole is being moved, may be prevented by some similar locking means for holding the steelyard immovable.

What is claimed is:—

1. An automatic price and weight indicating weighing machine, comprising in combination, a weight indicating means comprising a stationary part of the casing having minor order of weight graduations thereon, and a steelyard with major order of weight graduations thereon, the steelyard being movable relatively and in proximity to the stationary part of the casing bearing the graduations to enable the minor and major order of graduations to be read together; a price indicating means comprising a fixed part on the casing having a unit price scale, a rotatable member having a price indicating scale, a spindle on which the rotatable member is mounted, and a device connected with one end of the spindle for returning the rotatable member to the zero position; and a flexible member connecting one end of the spindle directly to the steelyard.

2. A weighing machine having a rotatable price drum connected by chain gearing to a steelyard or weighing beam, and provided with a weight for returning the drum, and holding the chain gearing taut; a counterpoise operating in a liquid contained in a vessel and connected to the steelyard; and means for closing the liquid containing vessel and for holding the counterpoise immovable therein, and for preventing the steelyard and price drum connected with the counterpoise from moving; substantially as and for the purposes set forth.

In testimony whereof I have signed my name to this specification in the presence of two subscribing witnesses.

HENRY POOLEY.

Witnesses:
SYDNEY E. HARRIS,
THOS. DAVIS.

Copies of this patent may be obtained for five cents each, by addressing the "Commissioner of Patents, Washington, D. C."